(12) United States Patent
Zhou et al.

(10) Patent No.: US 10,368,331 B2
(45) Date of Patent: Jul. 30, 2019

(54) METHOD FOR REGISTERING ON VOICE-OVER-LTE NETWORK, DEVICE AND TERMINAL, AND COMPUTER STORAGE MEDIUM

(71) Applicant: ONEPLUS TECHNOLOGY (SHENZHEN) CO., LTD., Shenzhen (CN)

(72) Inventors: Hanxin Zhou, Shenzhen (CN); Zhicheng Wang, Shenzhen (CN)

(73) Assignee: ONEPLUS TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 16/098,128

(22) PCT Filed: May 4, 2017

(86) PCT No.: PCT/CN2017/082999
§ 371 (c)(1),
(2) Date: Oct. 31, 2018

(87) PCT Pub. No.: WO2017/190667
PCT Pub. Date: Nov. 9, 2017

(65) Prior Publication Data
US 2019/0141656 A1    May 9, 2019

(30) Foreign Application Priority Data
May 4, 2016    (CN) .......................... 2016 1 0292786

(51) Int. Cl.
*H04W 60/00* (2009.01)
*H04L 29/06* (2006.01)
(Continued)

(52) U.S. Cl.
CPC .......... *H04W 60/00* (2013.01); *H04L 65/1016* (2013.01); *H04L 65/1073* (2013.01); *H04M 7/0066* (2013.01); *H04W 8/18* (2013.01)

(58) Field of Classification Search
CPC ....... H04W 4/50; H04W 8/183; H04W 8/205; H04W 8/18; H04W 60/00; H04W 60/05; H04W 60/02; H04W 60/06
See application file for complete search history.

(56) References Cited

U.S. PATENT DOCUMENTS

2008/0040274 A1*  2/2008  Uzo ....................... G06Q 20/40
                                                                705/44
2011/0195700 A1   8/2011  Kukuchka
(Continued)

FOREIGN PATENT DOCUMENTS

CN         1860727 A      11/2006
CN       104507070 A       4/2015
(Continued)

OTHER PUBLICATIONS

International Search Report in international application No. PCT/CN2017/082999, dated Aug. 1, 2017.
(Continued)

*Primary Examiner* — Jean A Gelin
(74) *Attorney, Agent, or Firm* — Syncoda LLC; Feng Ma

(57) ABSTRACT

A method for registering on a Voice-over-LTE network, a device and terminal, and computer storage medium include: detecting a Voice-over-LTE card so as to obtain the ICCID number of the Voice-over-LTE card; obtaining from the ICCID number a first IIN of the Voice-over-LTE card and a first length of the first IIN; obtaining an MBN list of the terminal so as to acquire a second IIN of each MBN file and a second length of the second IIN; determining whether the first length exceeds a preset value; if so, then sequentially comparing the second IIN to the first IIN until a second IIN (Continued)

having the same first N characters as the first IIN is found, the length of the N characters being the same as the second length; loading an MBN file corresponding to the second IIN so as to register on the Voice-over-LTE network.

16 Claims, 5 Drawing Sheets

(51) Int. Cl.
*H04M 7/00* (2006.01)
*H04W 8/18* (2009.01)

(56) References Cited

U.S. PATENT DOCUMENTS

| | | | |
|---|---|---|---|
| 2013/0058470 A1 | 3/2013 | Davis | |
| 2013/0060866 A1 | 3/2013 | Davis | |
| 2013/0115948 A1 | 5/2013 | Kukuchka et al. | |
| 2014/0269510 A1* | 9/2014 | Xu | H04W 8/06 370/328 |
| 2014/0293886 A1 | 10/2014 | Thakkar et al. | |
| 2014/0349634 A1 | 11/2014 | Kukuchka et al. | |
| 2015/0131619 A1* | 5/2015 | Zhu | H04W 36/0022 370/332 |
| 2016/0344572 A1* | 11/2016 | Brust | H04L 12/66 |
| 2017/0171904 A1* | 6/2017 | Wu | H04W 76/00 |
| 2017/0201911 A1* | 7/2017 | Ng | H04W 36/0022 |
| 2017/0265114 A1* | 9/2017 | Sahu | H04W 8/183 |
| 2017/0272936 A1* | 9/2017 | Liu | H04W 4/50 |
| 2018/0376442 A1* | 12/2018 | Shen | H04W 48/18 |
| 2019/0036562 A1* | 1/2019 | Thakkar | H04B 1/3816 |

FOREIGN PATENT DOCUMENTS

| | | |
|---|---|---|
| CN | 104661207 A | 5/2015 |
| CN | 104955023 A | 9/2015 |
| CN | 105101157 A | 11/2015 |
| CN | 105144763 A | 12/2015 |
| CN | 105530626 A | 4/2016 |
| CN | 106059998 A | 10/2016 |
| EP | 2680627 A1 | 1/2014 |

OTHER PUBLICATIONS

English Translation of the Written Opinion of the International Search Authority in international application No. PCT/CN2017/082999, dated Aug. 1, 2017.

Supplementary European Search Report in the European application No. 17792493.3, dated Mar. 27, 2019.

* cited by examiner

METHOD FOR REGISTERING ON VOICE-OVER-LTE NETWORK, DEVICE AND TERMINAL, AND COMPUTER STORAGE MEDIUM

CROSS-REFERENCE TO RELATED APPLICATIONS

The present application is filed based upon and claims priority to Chinese Patent Application No. 201610292786.8, filed on May 4, 2016, the contents of which are hereby incorporated by reference in its entirety.

TECHNICAL FIELD

The disclosure relates to the technical field of communication, and particularly to a method, device and terminal for registration on a Voice over Long Term Evolution (VoLTE) network and a computer storage medium.

BACKGROUND

An Internet Protocol (IP) Multimedia Subsystem (IMS)-based VoLTE refers to an IMS-based voice service structured on an LTE network, transmits a voice through an IP packet and may enable a mobile phone to receive a sound frequency ranging from 50 to 7,000 Hz. Therefore, the quality of voice calls is greatly improved.

At present, for a mobile phone supporting VoLTE, many MBN (modem software configuration) files are configured for different countries and different operators. MBN is marketed by the Qualcomm Incorporated to meet modem software configuration solutions of multiple manufacturers, multiple network types and multiple purposes. After a 4th-Generation (4G) Subscriber Identity Module (SIM) card supporting a VoLTE function is inserted into a mobile phone and detected by a modem successfully, an Integrate Circuit Card Identity (ICCID) is acquired, and a correct Issuer Identification Number (IIN) value is acquired according to the ICCID. The ICCID is solidified in the SIM card of the mobile phone and the IIN is used to distinguish between different operators. An MBN list is searched for an MBN file for a corresponding operator according to the IIN, and then the MBN file is automatically loaded. After the MBN file is successfully loaded, the mobile phone may activate a configuration item related to the VoLTE function in the MBN file and registere on a VoLTE network.

However, in different countries or regions, SIM cards that support the VoLTE service are different. A length of the IIN obtained from the ICCID is usually 6 to 7 bits, and an MBN file for a corresponding operator may be queried by a mobile phone according to the IIN. However, the length of the IIN of the operating company in some countries (for example, "Reliance" in India) reachs 11 bits, which makes it impossible for a mobile phone to find a corresponding MBN file from the MBN list. Therefore, the existing method for querying the MBN file has a low success rate. Since an MBN file may not be loaded, registration on the VoLTE network may not be implemented and a user may not access the Internet and make a voice call.

SUMMARY

In view of this, it is necessary to provide a method, device and terminal for registration on a VoLTE network and a computer storage medium, which may increase a success rate for querying an MBN to implement successful registration on the VoLTE network.

Embodiments of the disclosure provide a method for registration on a VoLTE network, which include the following steps.

A VoLTE card is detected to acquire an ICCID number of the VoLTE card.

A first IIN of the VoLTE card and a first length of the first IIN are acquired from the ICCID number.

An MBN list of a terminal is acquired to obtain a second IIN of each MBN file in the MBN list and a second length of the second IIN.

Whether the first length exceeds a preset value or not is determined.

In the case that the first length exceeds the preset value, the second IINs are sequentially compared with the first TIN until a second IIN that is identical to a first N characters of the first IIN is found, a length of the N characters being the same as the second length.

The MBN file corresponding to the found second IIN is loaded to register on the VoLTE network.

In an embodiment, in the case that the first length of the first IIN does not exceed the preset value, the following steps may be executed.

The MBN list of the terminal is queried according to the first IIN to obtain a matched MBN file.

The matched MBN file is loaded to register on the VoLTE network.

In an embodiment, the step that the second IINs are sequentially compared with the first IIN until the second TIN that is identical to the first N characters of the first IIN is found may include the following steps.

The second IINs are sequentially compared with the first N characters of the first IIN until the second IIN that is identical to the first N characters of the first IIN is found.

The first TIN is modified into the second IIN to obtain a corrected first IIN.

The step that the MBN file corresponding to the found second IIN is loaded to register on the VoLTE network may include the following steps.

The MBN list of the terminal is queried according to the corrected first TIN to obtain a matched MBN file.

The matched MBN file is loaded to register on the VoLTE network.

In an embodiment, the step that the second IINs are sequentially compared with the first N characters of the first IIN until the second IIN that is identical to the first N characters of the first IIN is found may include the following steps.

The second TIN of a first MBN file in the MBN list is extracted.

Whether the second TIN is identical to the first N characters of the first TIN or not is determined.

In the case that the second TIN is identical to the first N characters of the first IIN, the step that the first TIN is modified into the second IIN to obtain the corrected first TIN is executed.

In the case that the second TIN is different from the first N characters of the first IIN, the second IIN of a next MBN file in the MBN list is extracted and the step that whether the second IIN is identical to the first N characters of the first IIN or not is determined is re-executed.

In an embodiment, the step that the MBN list of the terminal is queried according to the first TIN to obtain the matched MBN file may include the following steps.

The MBN list of the terminal is searched for a second IIN of which first M characters are identical to the first IIN, a length of the M characters being the same as the first length.

The MBN file corresponding to the searched out second IIN is determined to be the MBN file matched with the first IIN.

The embodiments of the disclosure provide a device for registration on a VoLTE network, which includes a detection module, a first acquisition module, a second acquisition module, a determination module, a comparison module and a loading module.

The detection module is configured to detect a VoLTE card to acquire an ICCID number of the VoLTE card.

The first acquisition module is configured to acquire a first IIN of the VoLTE card and a first length of the first IIN from the ICCID number.

The second acquisition module is configured to acquire an MBN list of a terminal to obtain a second IIN of each MBN file in the MBN list and a second length of the second IIN.

The determination module is configured to determine whether the first length exceeds a preset value or not.

The comparison module is configured to, when the determination module determines that the first length exceeds the preset value, sequentially compare the second IINs with the first IIN until a second TIN that is identical to first N characters of the first IIN is found, a length of the N characters being the same as the second length.

The loading module is configured to load the MBN file corresponding to the found second IIN to register on the VoLTE network.

In an embodiment, the device may further include a query module, configured to, when the determination module determines that the first length does not exceed the preset value, query the MBN list of the terminal according to the first IIN to obtain a matched MBN file.

The loading module may further be configured to load the matched MBN file to register on the VoLTE network.

In an embodiment, the determination module may be configured to sequentially compare the second IINs with the first N characters of the first IIN until the second TIN that is identical to the first N characters of the first IIN is found.

The device may further include a correction module.

The correction module may be configured to modify the first IIN into the second IIN to obtain a corrected first IIN.

The query module may further be configured to query the MBN list of the terminal according to the corrected first IIN to obtain a matched MBN file.

In an embodiment, the determination module may include an extraction unit and a determination unit, and the extraction unit may be configured to extract the second IIN of a first MBN file in the MBN list.

The determination unit may be configured to determine whether the second IIN is identical to the first N characters of the first IIN or not.

The correction module may be configured to, when the determination unit determines that the second IIN is identical to the first N characters of the first IIN, modify the first IIN into the second IIN to obtain the corrected first IIN.

The extraction unit may further be configured to, when the determination unit determines that the second TIN is different from the first N characters of the first IIN, extract the second IIN of a next MBN file in the MBN list.

When executing processing, the detection module, the first acquisition module, the second acquisition module, the determination module, the comparison module, the loading module, the query module, the correction module and the extraction unit may be implemented by adopting a Central Processing Unit (CPU), a Digital Signal Processor (DSP) or a Field-Programmable Gate Array (FPGA).

The embodiments of the disclosure provide a terminal, which include the abovementioned device for registration on the VoLTE network.

The embodiments of the disclosure provide a terminal, which include a storage medium and a processor.

The storage medium is configured to store computer-executable instructions.

The processor is configured to execute the computer-executable instructions stored in the storage medium, the computer-executable instructions being configured to execute the abovementioned method for registration on the VoLTE network.

The embodiments of the disclosure provide a computer storage medium having stored therein computer-executable instructions for executing the abovementioned method for registration on the VoLTE network.

According to the method in the embodiments of the disclosure for registration on the VoLTE network, when the length of the IIN of the VoLTE card is excessively long and exceeds the preset value and no corresponding MBN file may be found, the MBN list of the terminal is acquired to obtain the IIN of each MBN file in the MBN list and the length thereof, the IINs of the MBN files are compared with the IIN of the VoLTE card to find the IIN of the corresponding MBN file, the MBN file corresponding to the IIN is determined to be the MBN file matched with the VoLTE card and the file may be loaded for registration on the network. By this method, a success rate for querying an MBN file is increased, the problem that registration on the VoLTE network may not be implemented is solved and a user experience is improved.

DETAILED DESCRIPTION

For making purposes, technical solutions and advantages of the disclosure clearer, the disclosure will further be described below in detail in combination with the drawings and the embodiments. It is to be understood that specific embodiments described herein are only adopted to explain the disclosure and not intended to limit the disclosure.

Figure 1:
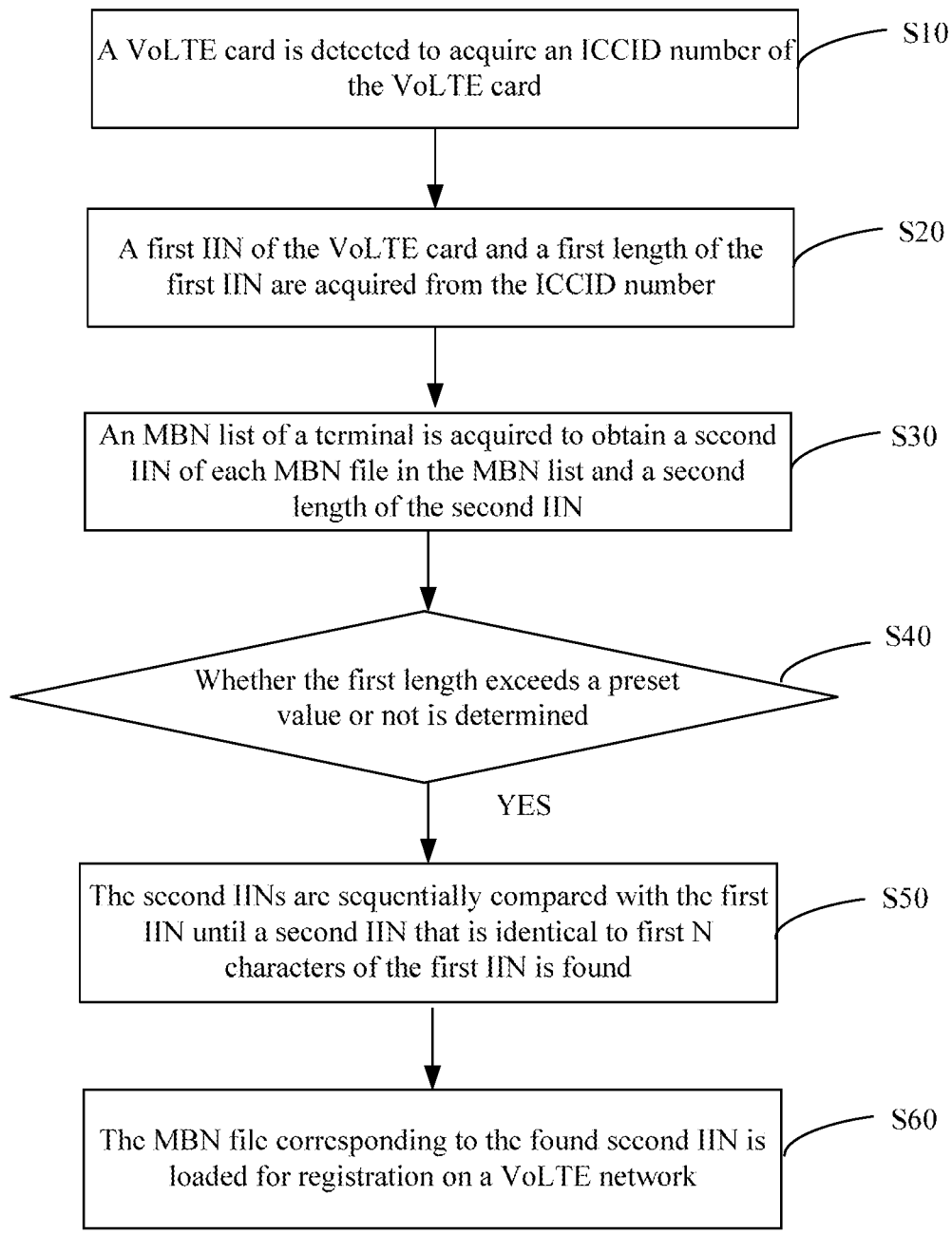
FIG. 1 is a flowchart of a method for registration on a VoLTE network according to an embodiment.

As shown in FIG. 1, a method for registration on a VoLTE network includes the following steps.

In S10, a VoLTE card is detected to acquire an ICCID number of the VoLTE card.

Specifically, the VoLTE card is a SIM card supporting the VoLTE network. Responsive to detecting that the VoLTE card is inserted into a terminal, a flow for detecting the SIM card is started and the ICCID number of the VoLTE card is acquired from the VoLTE card.

An ICCID is a card number of the SIM card, which is solidified in the SIM card of a mobile phone and comprehensively reflects contents such as an issuing country, a network number, an issuing region, an issuing time, a manufacturer and printing serial number of the card.

In S20, a first HN of the VoLTE card and a first length of the first HN are acquired from the ICCID number.

The first HN is related to an operator, and the operator of the VoLTE card may be determined according to the first IIN.

In S30, an MBN list of a terminal is acquired to obtain a second IIN of each MBN file in the MBN list and a second length of the second HN.

The first HN is an IIN corresponding to the VoLTE card. The second HN is an IIN corresponding to the MBN file of the terminal and corresponds to the IIN of the VoLTE card. For different operators, IINs are also different. For example, a first IIN corresponding to an operator "Reliance" in India is "89918610400" and has a length of 11 characters, while in a mobile phone of a certain brand, a second IIN of an MBN file corresponding to the operator is "899186" and has a length of six characters.

In S40, whether the first length exceeds a preset value or not is determined.

A length of the first HN obtained from the ICCID is usually 6 bits or 7 bits. MBN files corresponding to different operators also have corresponding IINs which are usually also 6 bits or 7 bits. Therefore, in a specific embodiment, the preset value is set to be 7.

If the result of the determination in S40 is YES, that is, the first length exceeds the preset value, S50 is executed.

In S50, the second IINs are sequentially compared with the first IIN until a second IIN that is identical to the first N characters of the first IIN is found.

The second length of the second IIN is usually less than or equal to the preset value. When the first length of the first TIN is larger than the preset value, the second IINs of all the MBN files are sequentially compared with the first IIN until a second IIN that is identical to the first N characters of the first TIN is found. The length of the N characters is the same as the second length.

In a specific embodiment, the first N characters in the first IIN may be sequentially compared with the second IINs. Comparison is performed to determine whether the first N characters of the first TIN are identical to the second IIN or not. If the first N characters of the first TIN are different from the second IIN, the first N characters of the first TIN may be compared with a next second TIN until a second TIN that is identical to the first N characters of the first IIN is found.

In S60, the MBN file corresponding to the second TIN is loaded to register on the VoLTE network.

The MBN file corresponding to the second IIN that is found by comparison and identical to the first N characters of the first IIN is a MBN file matched with the VoLTE network. The MBN file may be loaded to activate a configuration item related to the VoLTE function in the MBN file, thereby implementing registration on the VoLTE network.

According to the method for registration on the VoLTE network, when the length of the IIN of the VoLTE card is excessively long and exceeds the preset value and no corresponding MBN file may be found, the MBN list of the terminal is acquired to obtain the TIN of each MBN file in the MBN list and the length thereof, the IINs of the MBN files are compared with the IIN of the VoLTE card to find the IIN of the corresponding MBN file, the MBN file corresponding to the IIN is determined to be the MBN file matched with the VoLTE card, and the file may be loaded to register on the network. By this method, a success rate for querying an MBN file is increased, the problem that registration on the VoLTE network may not be implemented is solved and a user experience is improved.

Figure 2:
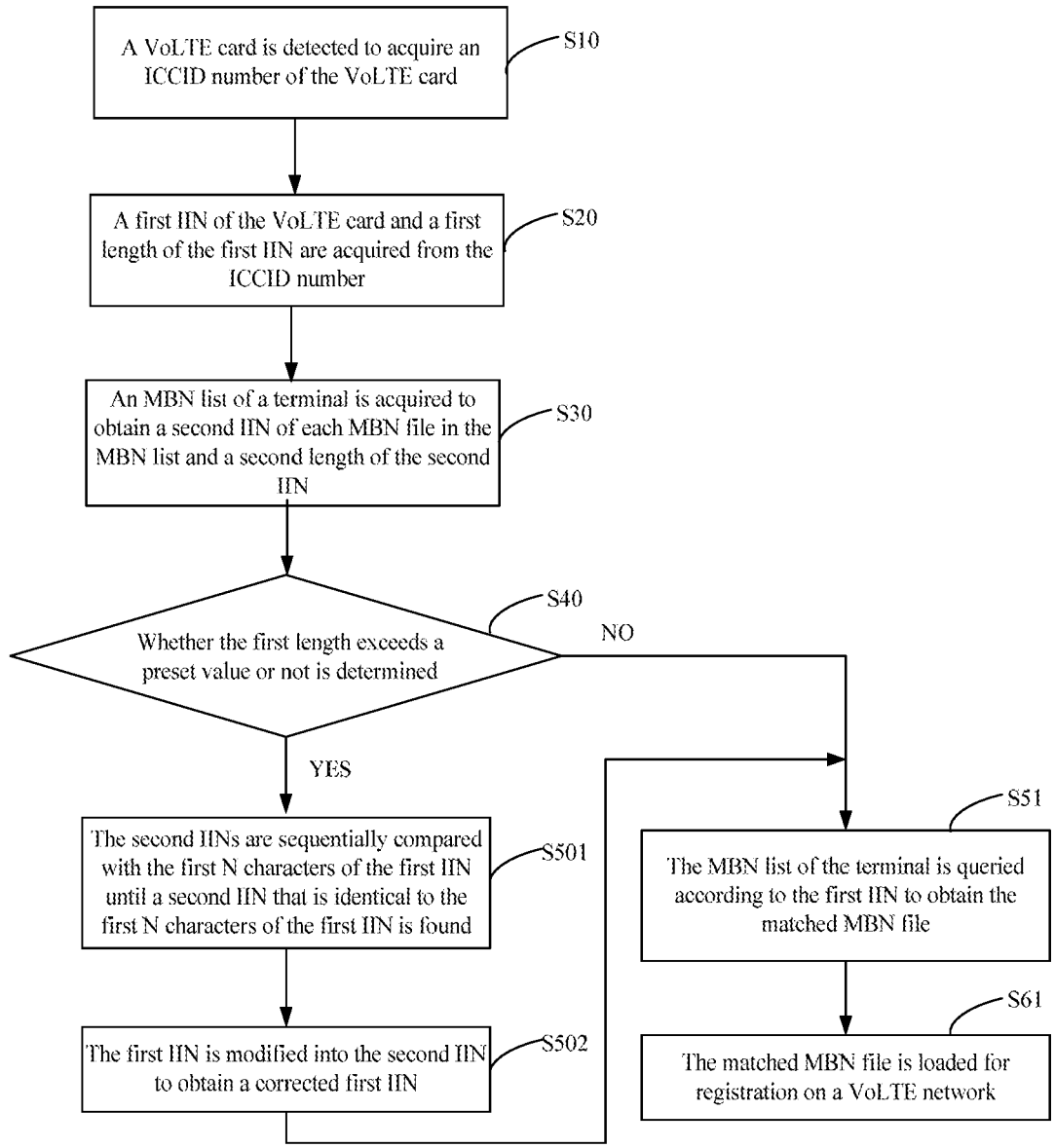
FIG. 2 is a flowchart of a method for registration on a VoLTE network according to an embodiment.

As shown in FIG. 2, if the result of the determination in S40 is NO, that is, the first length of the first IIN does not exceed the preset value, the following steps are executed.

In S51, the MBN list of the terminal is queried according to the first TIN to obtain the matched MBN file.

Specifically, the MBN list of the terminal is queried according to the first IIN to obtain a MBN file corresponding to the first IIN, and the MBN file is the MBN file matched with the first IIN.

In S61, the matched MBN file is loaded to register on the VoLTE network.

The MBN file may be loaded to activate the configuration item related to the VoLTE function in the MBN file, thereby implementing registration on the VoLTE network.

Still referring to FIG. 2, in another embodiment, S50 includes the following steps.

In S501, the second IINs are sequentially compared with the first N characters of the first IIN until a second IIN that is identical to the first N characters of the first IIN is found.

In S502, the first IIN is modified into the second TIN to obtain a corrected first IIN.

After the second IIN that is identical to the first N characters of the first TIN is found, the first IIN is modified into the second IIN to obtain the corrected first TIN. For example, for the operator "Reliance" in India, the first IIN corresponding to the operator is "89918610400", while in the mobile phone of a certain brand, the second IIN of the MBN file corresponding to the operator is "899186" and includes six characters. When the second IIN corresponding to the first six characters in the first IIN is found, the original first IIN is replaced and a corrected first IIN is "899186".

In the embodiment, S60 includes the following steps.

The MBN list of the terminal is queried according to the corrected first TIN to obtain the matched MBN file. The matched MBN file is loaded to register on the VoLTE network.

That is, in the embodiment, after S502 is executed, the method may return to S51 to query the MBN list of the terminal according to the corrected first IIN to obtain the matched MBN file and load the matched MBN file for registration on the VoLTE network.

According to the embodiment, after the second IIN corresponding to the first IIN is found, the first IIN is replaced with the second TIN. Since the replaced first IIN has a shortened character length and is an TIN corresponding to the MBN file, the matched MBN file may be found according to the corrected first IIN. The file is loaded for registration on the VoLTE network.

Figure 3:
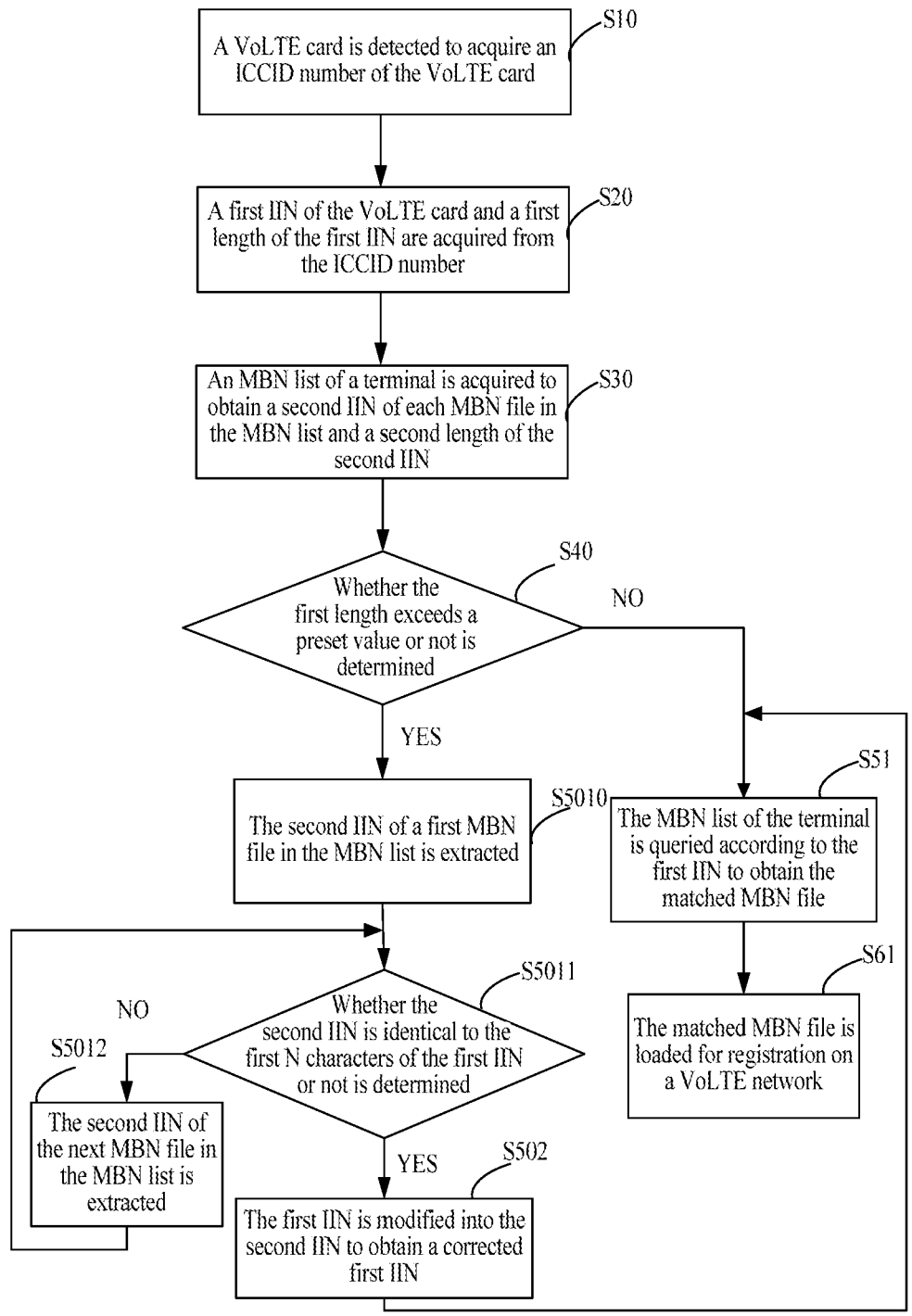
FIG. 3 is a flowchart of a method for registration on a VoLTE network according to an embodiment.

In another embodiment, as shown in FIG. 3, S501 includes the following steps.

In S5010, a second HN of the first MBN file in the MBN list is extracted.

In S5011, whether the second IIN is identical to the first N characters of the first IIN or not is determined.

If YES, S502 is executed, that is, the first IIN is modified into the second IIN to obtain the corrected first IIN.

If NO, the S012 is executed, that is, a second IIN of the next MBN file in the MBN list is extracted and whether the second IIN is identical to the first N characters of the first IIN or not is determined.

In a specific embodiment, an array may be established for all second IINs of the MBN list. An 0th element in the array is extracted, and an initial value of O is 1. Whether the second IIN of the Oth element is identical to the first N characters of the first IIN or not is determined. If YES, it is determined that matching succeeds and the first IIN is modified into the second IIN to obtain the corrected first IIN. If NO, it is set that O=O+1 and S5011 is re-executed. The steps are cyclically executed until the matched second HN is found.

In another embodiment, S51 includes the following steps.

In S510, the MBN list of the terminal is searched for a second IIN of which the first M characters are identical to the first IIN.

A length of the M characters is the same as the first length and namely is the same as the length of the first IIN.

In S511, the MBN file corresponding to the second IIN is determined to be the MBN file matched with the first IIN.

When the result of the determination in S40 is NO, that is, the length of the first IIN does not exceed the preset value, and/or when the original first IIN with a relatively large length is replaced with the second HN of the matched MBN file so that a length of the finally obtained first HN is less than or equal to the preset value if the result of the determination in S40 is YES, the MBN list of the terminal is searched for the second IIN of which the first M characters are identical to the first IIN, and the length of the M characters is the same as the length of the first IIN. The MBN file corresponding to the second IIN is the MBN file matched with the first HN. The MBN file may be loaded to activate the configuration item related to the VoLTE function in the MBN file, thereby implementing registration on the VoLTE network.

Figure 4:
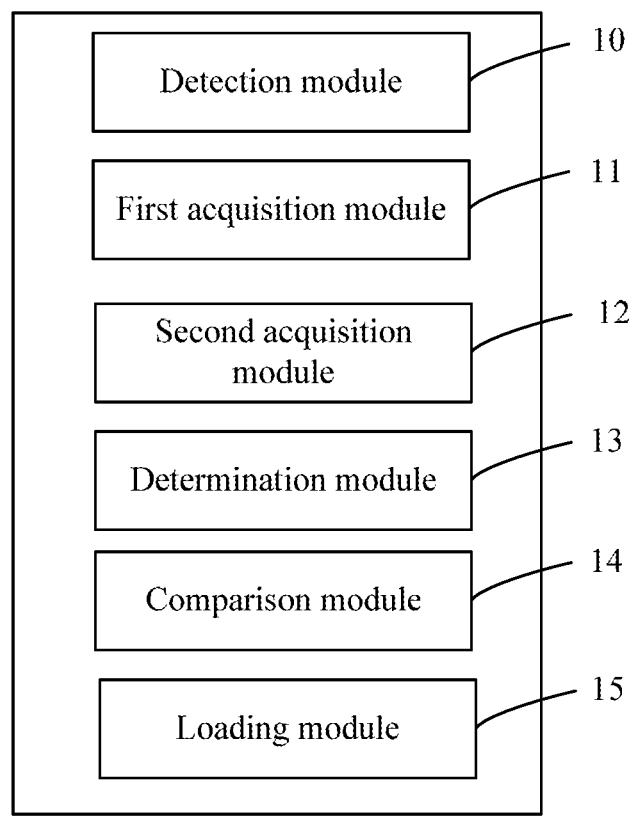
FIG. 4 is a schematic diagram showing functional modules of a device for registration on a VoLTE network according to an embodiment.

The disclosure also provides a device for registration on a VoLTE network, which, as shown in FIG. 4, includes a detection module 10, a first acquisition module 11, a second acquisition module 12, a determination module 13, a comparison module 14 and a loading module 15.

The detection module 10 is configured to detect a VoLTE card to acquire an ICCID number of the VoLTE card.

Specifically, the VoLTE card is a SIM card supporting the VoLTE network. Responsive to detecting that the VoLTE card is inserted into a terminal, a flow for detecting the SIM card is started and the ICCID number of the VoLTE card is acquired from the VoLTE card.

An ICCID is a card number of the SIM card, is solidified in the SIM card of a mobile phone and comprehensively reflects contents such as an issuing country, a network number, an issuing region, an issuing time, a manufacturer and printing serial number of the card.

The first acquisition module 11 is configured to acquire a first IIN of the VoLTE card and a first length of the first HN from the ICCID number.

The first IIN is related to an operator and the operator of the VoLTE card may be determined according to the first IIN.

The second acquisition module 12 is configured to acquire an MBN list of a terminal to obtain a second IIN of each MBN file in the MBN list and a second length of the second HN.

The first HN is an IIN corresponding to the VoLTE card. The second HN is an IIN corresponding to the MBN file of the terminal and corresponds to the IIN of the VoLTE card. For different operators, IINs are also different. For example, a first IIN corresponding to an operator "Reliance" in India is "89918610400" and has a length of 11 characters, while in a mobile phone of a certain brand, a second IIN of an MBN file corresponding to the operator is "899186" and has a length of six characters.

The determination module 13 is configured to determine whether the first length exceeds a preset value or not.

A length of the first HN obtained from the ICCID is usually 6 bits or 7 bits. MBN files corresponding to different operators also have corresponding IINs which are usually also 6 bits or 7 bits. Therefore, in a specific embodiment, the preset value is set to be 7.

The comparison module 14 is configured to, when a result of the determination in the determination module is YES, sequentially compare the second IINs with the first IIN until a second IIN that is identical to the first N characters of the first TIN is found.

The second length of the second IIN is usually less than or equal to the preset value. When the first length of the first IIN is larger than the preset value, the second IINs of all the MBN files are sequentially compared with the first IIN until a second IIN that is identical to the first N characters of the first TIN is found, and the length of the N characters is the same as the second length.

In a specific embodiment, the first N characters in the first IIN may be sequentially compared with the second IINs. Comparison is performed to determine whether the first N characters of the first TIN are identical to a second IIN or not. If the first N characters of the first IIN are different from the second IIN, the first N characters of the first IIN may be compared with a next second IIN until a second IIN that is identical to the first N characters of the first IIN is found.

The loading module 15 is configured to load the MBN file corresponding to the second TIN to register on the VoLTE network.

The MBN file corresponding to the second IIN that is found by comparison and identical to the first N characters of the first IIN is the MBN file matched with the VoLTE network. The MBN file may be loaded to activate a configuration item related to the VoLTE function in the MBN file, thereby implementing registration on the VoLTE network.

According to the device for registration on the VoLTE network, when the length of the IIN of the VoLTE card is excessively long and exceeds the preset value and no corresponding MBN file may be found, the MBN list of the terminal is acquired to obtain the IIN of each MBN file in the MBN list and the length thereof, the IINs of the MBN files are compared with the IIN of the VoLTE card to find the IIN of the corresponding MBN file, the MBN file corresponding to the TIN is determined to be the MBN file matched with the VoLTE card, and the file may be loaded for registration on the network. By this device, a success rate for querying an MBN file is increased, the problem that registration on the VoLTE network may not be implemented is solved and a user experience is improved.

Figure 5:
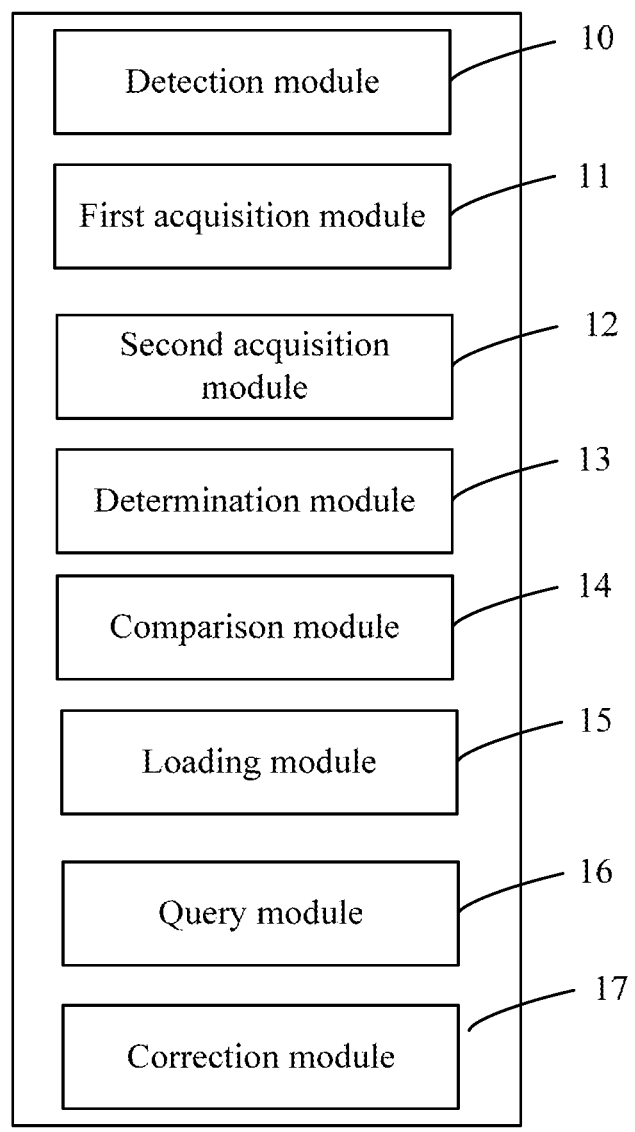
FIG. 5 is a schematic diagram showing functional modules of a device for registration on a VoLTE network according to an embodiment.

As shown in FIG. 5, the device for registration on the VoLTE network further includes a query module 16.

The query module 16 is configured to, when the result of the determination in the determination module is NO, query the MBN list of the terminal according to the first HN to obtain the matched MBN file.

Specifically, the MBN list of the terminal is queried according to the first IIN to obtain the MBN file corresponding to the first HN, and the MBN file is the MBN file matched with the first IIN.

The loading module 15 is further configured to load the matched MBN file to register on the VoLTE network.

The MBN file may be loaded to activate the configuration item related to the VoLTE function in the MBN file, thereby implementing registration on the VoLTE network.

In another embodiment, the determination module 13 is configured to sequentially compare the second IINs with the first N characters of the first IIN until a second IIN that is identical to the first N characters of the first IIN is found.

The device further includes a correction module 17, configured to modify the first HN into the second IIN to obtain a corrected first HN.

After the second IIN that is identical to the first N characters of the first IIN is found, the first IIN is modified into the second HN to obtain the corrected first HN. For example, for the operator "Reliance" in India, the first IIN corresponding to the operator is "89918610400", while in the mobile phone of a certain brand, the second IIN of the MBN file corresponding to the operator is "899186" and includes six characters. When the second IIN corresponding to the first six characters of the first IIN is found, the original first IIN is replaced and a corrected first IIN is "899186".

The query module 16 is further configured to query the MBN list of the terminal according to the corrected first IIN to obtain the matched MBN file.

In the embodiment, the MBN list of the terminal is queried according to the corrected first HN to obtain the matched MBN file and the matched MBN file is loaded to register on the VoLTE network.

According to the embodiment, after the second HN corresponding to the first IIN is found, the first IIN is replaced with the second IIN. Since the replaced first IIN has a shortened character length and is an HN corresponding to the MBN file, the matched MBN file may be found according to the corrected first IIN. The file is loaded for registration on the VoLTE network.

In another embodiment, the determination module 13 includes an extraction unit and a determination unit.

The extraction unit is configured to extract the second IIN of the first MBN file in the MBN list.

The determination unit is configured to determine whether the second IIN is identical to the first N characters of the first IIN or not.

The correction module 17 is configured to, when a result of the determination in the determination unit is YES, modify the first IIN into the second IIN to obtain the corrected first TIN.

The extraction unit is further configured to, when a result of the determination in the determination unit is NO, extract the second IIN of a next MBN file in the MBN list.

In a specific embodiment, an array may be established for all second IINs of the MBN list. An Oth element in the array is extracted, and an initial value of O is 1. Whether the second IIN of the Oth element is identical to the first N characters of the first IIN or not is determined. If YES, it is determined that matching succeeds and the first IIN is modified into the second IIN to obtain the corrected first IIN. If NO, it is set that O=O+1. The steps are cyclically executed until the matched second TIN is found.

In another embodiment, the query module 16 is specifically configured to search the MBN list of the terminal for a second IIN of which the first M characters are identical to the first IIN and determine the MBN file corresponding to the second IIN to be the MBN file matched with the first IIN.

When the length of the first IIN does not exceed the preset value, that is, the length of the original first IIN does not exceed the preset value, or the original first IIN with a relatively large length is replaced with the second IIN of the matched MBN file so as to make a length of the finally obtained first IIN is less than or equal to the preset value if the length of the first IIN exceeds the preset value, the MBN list of the terminal is searched for the second IIN of which the first M characters are identical to the first IIN, the length of the M characters is the same as the length of the first IIN. The MBN file corresponding to the second TIN is the MBN file matched with the first IIN and the MBN file may be loaded to activate the configuration item related to the VoLTE function in the MBN file, thereby implementing registration on the VoLTE network.

The disclosure also provides a terminal, which includes the abovementioned device for registration on the VoLTE network.

Specifically, the terminal includes equipment supporting a SIM card, including, but not limited to, a mobile phone, a tablet phone and a smart watch.

An embodiment of the disclosure provides a terminal, which includes a storage medium and a processor.

The storage medium is configured to store computer-executable instructions.

The processor is configured to execute the computer-executable instructions stored in the storage medium, the computer-executable instructions being configured to execute the abovementioned method for registration on the VoLTE network.

An embodiment of the disclosure provides a computer storage medium, in which computer-executable instructions is stored, the computer-executable instructions being configured to execute the abovementioned method for registration on the VoLTE network.

Each technical feature of the abovementioned embodiments may be freely combined. For brief description, not all possible combinations of each technical feature in the abovementioned embodiments are described, but all the combinations of these technical features shall fall within the scope recorded in the description without conflicts.

The abovementioned embodiments only express some implementation modes of the disclosure and are specifically described in detail, which are not to be construed as limiting the scope of the disclosure. It is to be noted that various changes and modifications may be made by those skilled in the art without departing from the concept of the disclosure, and all of these fall within the scope of protection of the disclosure. Therefore, the scope of protection of the disclosure should be subject to the appended claims.

INDUSTRIAL APPLICABILITY

According to the method in the embodiments of the disclosure for registration on the VoLTE network, when the length of the IIN of the VoLTE card is excessively long and exceeds the preset value and no corresponding MBN file may be found, the MBN list of the terminal is acquired to obtain the IIN of each MBN file in the MBN list and the length thereof, the IINs of the MBN files are compared with the IIN of the VoLTE card to find the IIN of the corresponding MBN file, the MBN file corresponding to the IIN is determined to be the MBN file matched with the VoLTE card and the file may be loaded for registration on the network. By this method, a success rate for querying an MBN file is increased, the problem that registration on the VoLTE network may not be implemented is solved and a user experience is improved.

The invention claimed is:
1. A method for registration on a Voice over Long Term Evolution (VoLTE) network, comprising:
   detecting a VoLTE card to acquire an Integrate Circuit Card Identity (ICCID) number of the VoLTE card;

acquiring a first Issuer Identification Number (IIN) of the VoLTE card and a first length of the first IIN from the ICCID number;
acquiring a modem software configuration (MBN) list of a terminal to obtain a second IIN of each MBN file in the MBN list and a second length of the second IIN;
determining whether the first length exceeds a preset value or not;
in the case that the first length exceeds the preset value, sequentially comparing the second IINs with the first IIN until a second IIN that is identical to first N characters of the first IIN is found, a length of the N characters being the same as the second length; and
loading the MBN file corresponding to the found second IIN to register on the VoLTE network.

2. The method for registration on the VoLTE network of claim 1, further comprising:
in the case that the first length of the first IIN does not exceed the preset value,
querying the MBN list of the terminal according to the first IIN to obtain a matched MBN file; and
loading the matched MBN file to register on the VoLTE network.

3. The method for registration on the VoLTE network of claim 2, wherein the step of querying the MBN list of the terminal according to the first IIN to obtain the matched MBN file comprises:
searching the MBN list of the terminal for the second IIN of which a first M characters are identical to the first IIN, a length of the M characters being the same as the first length; and
determining the MBN file corresponding to the searched out second IIN to be the MBN file matched with the first IIN.

4. The method for registration on the VoLTE network of claim 1, wherein
the step of sequentially comparing the second IINs with the first IIN until a second IIN that is identical to the first N characters of the first IIN is found comprises:
sequentially comparing the second IINs with the first N characters of the first IIN until the second IIN that is identical to the first N characters of the first IIN is found; and
modifying the first IIN into the second IIN to obtain a corrected first IIN; and
the step of loading the MBN file corresponding to the found second IIN to register on the VoLTE network comprises:
querying the MBN list of the terminal according to the corrected first IIN to obtain a matched MBN file; and
loading the matched MBN file to register on the VoLTE network.

5. The method for registration on the VoLTE network of claim 4, wherein the step of sequentially comparing the second IINs with the first N characters of the first IIN until the second IIN that is identical to the first N characters of the first IIN is found comprises:
extracting the second IIN of a first MBN file in the MBN list;
determining whether the second IIN is identical to the first N characters of the first IIN or not;
in the case that the second IIN is identical to the first N characters of the first IIN, executing the step of modifying the first IIN into the second IIN to obtain the corrected first IIN; and
in the case that the second IIN is different from the first N characters of the first IIN, extracting the second IIN of a next MBN file in the MBN list and returning to the step of determining whether the second IIN is identical to the first N characters of the first IIN or not.

6. The method for registration on the VoLTE network of claim 4, wherein the step of querying the MBN list of the terminal according to the first IIN to obtain the matched MBN file comprises:
searching the MBN list of the terminal for the second IIN of which a first M characters are identical to the first IIN, a length of the M characters being the same as the first length; and
determining the MBN file corresponding to the searched out second IIN to be the MBN file matched with the first IIN.

7. A terminal for registration on a Voice over Long Term Evolution (VoLTE) network, comprising a processor and a memory for storing a set of instructions executable by the processor, wherein when the instructions are executed by the processor, the processor is configured to:
detect a VoLTE card to acquire an Integrate Circuit Card Identity (ICCID) number of the VoLTE card;
acquire a first Issuer Identification Number (IIN) of the VoLTE card and a first length of the first IIN from the ICCID number;
acquire a modem software configuration (MBN) list of a terminal to obtain a second IIN of each MBN file in the MBN list and a second length of the second IIN;
determine whether the first length exceeds a preset value or not;
when it is determined that the first length exceeds the preset value, sequentially compare the second IINs with the first IIN until a second IIN that is identical to a first N characters of the first IIN is found, a length of the N characters being the same as the second length; and
load the MBN file corresponding to the found second IIN to register on the VoLTE network.

8. The terminal for registration on the VoLTE network of claim 7, wherein the processor is further configured to:
when it is determined that the first length does not exceed the preset value, query the MBN list of the terminal according to the first IIN to obtain a matched MBN file,
load the matched MBN file to register on the VoLTE network.

9. The terminal for registration on the VoLTE network of claim 7, wherein the processor is further configured to:
sequentially compare the second IINs with the first N characters of the first IIN until the second IIN that is identical to the first N characters of the first IIN is found;
modify the first IIN into the second IIN to obtain a corrected first IIN; and
query the MBN list of the terminal according to the corrected first IIN to obtain a matched MBN file.

10. The terminal for registration on the VoLTE network of claim 9,
wherein the processor is further configured to:
extract the second IIN of a first MBN file in the MBN list; and
determine whether the second IIN is identical to the first N characters of the first IIN or not;
when it is determined that the second IIN is identical to the first N characters of the first IIN, modify the first IIN into the second IIN to obtain the corrected first IIN; and when it is determined that the second IIN is different from the first N characters of the first IIN, extract the second IIN of a next MBN file in the MBN list.

11. A non-transitory computer storage medium having stored therein computer-executable instructions for executing a method for registration on a Voice over Long Term Evolution (VoLTE) network, wherein the method comprises:
  detecting a VoLTE card to acquire an Integrate Circuit Card Identity (ICCID) number of the VoLTE card;
  acquiring a first Issuer Identification Number (IIN) of the VoLTE card and a first length of the first IIN from the ICCID number;
  acquiring a modem software configuration (MBN) list of a terminal to obtain a second IIN of each MBN file in the MBN list and a second length of the second IIN;
  determining whether the first length exceeds a preset value or not;
  in the case that the first length exceeds the preset value, sequentially comparing the second IINs with the first IIN until a second IIN that is identical to first N characters of the first IIN is found, a length of the N characters being the same as the second length; and
  loading the MBN file corresponding to the found second IIN to register on the VoLTE network.

12. The non-transitory computer storage medium of claim 11, wherein the method further comprises:
  in the case that the first length of the first IIN does not exceed the preset value,
  querying the MBN list of the terminal according to the first IIN to obtain a matched MBN file; and
  loading the matched MBN file to register on the VoLTE network.

13. The non-transitory computer storage medium of claim 12, wherein the step of querying the MBN list of the terminal according to the first IIN to obtain the matched MBN file comprises:
  searching the MBN list of the terminal for the second IIN of which a first M characters are identical to the first IIN, a length of the M characters being the same as the first length; and
  determining the MBN file corresponding to the searched out second IIN to be the MBN file matched with the first IIN.

14. The non-transitory computer storage medium of claim 11, wherein the step of sequentially comparing the second IINs with the first IIN until a second IIN that is identical to the first N characters of the first IIN is found comprises:
  sequentially comparing the second IINs with the first N characters of the first IIN until the second IIN that is identical to the first N characters of the first IIN is found; and
  modifying the first IIN into the second IIN to obtain a corrected first IIN; and
the step of loading the MBN file corresponding to the found second IIN to register on the VoLTE network comprises:
  querying the MBN list of the terminal according to the corrected first IIN to obtain a matched MBN file; and
  loading the matched MBN file to register on the VoLTE network.

15. The non-transitory computer storage medium of claim 14, wherein the step of sequentially comparing the second IINs with the first N characters of the first IIN until the second IIN that is identical to the first N characters of the first IIN is found comprises:
  extracting the second IIN of a first MBN file in the MBN list;
  determining whether the second IIN is identical to the first N characters of the first IIN or not;
  in the case that the second IIN is identical to the first N characters of the first IIN, executing the step of modifying the first IIN into the second IIN to obtain the corrected first IIN; and
  in the case that the second IIN is different from the first N characters of the first IIN, extracting the second IIN of a next MBN file in the MBN list and returning to the step of determining whether the second IIN is identical to the first N characters of the first IIN or not.

16. The non-transitory computer storage medium of claim 14, wherein the step of querying the MBN list of the terminal according to the first IIN to obtain the matched MBN file comprises:
  searching the MBN list of the terminal for the second IIN of which a first M characters are identical to the first IIN, a length of the M characters being the same as the first length; and
  determining the MBN file corresponding to the searched out second IIN to be the MBN file matched with the first IIN.

* * * * *